Nov. 16, 1943. J. F. SCHMIDT 2,334,221
POWER TRANSMISSION APPARATUS
Filed July 24, 1942 2 Sheets-Sheet 1
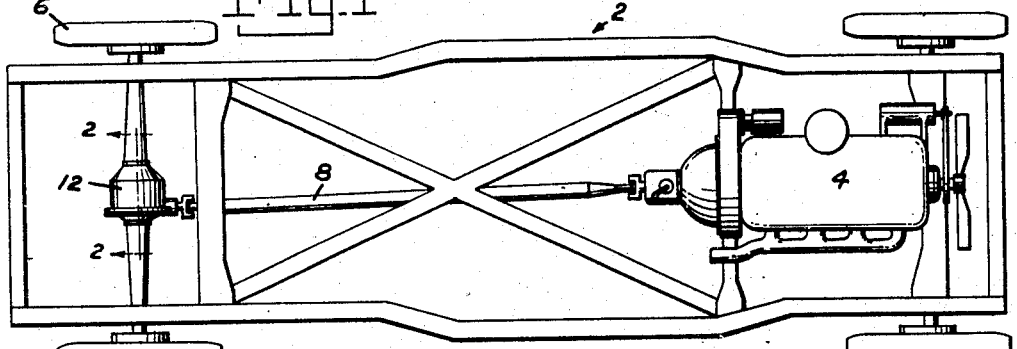
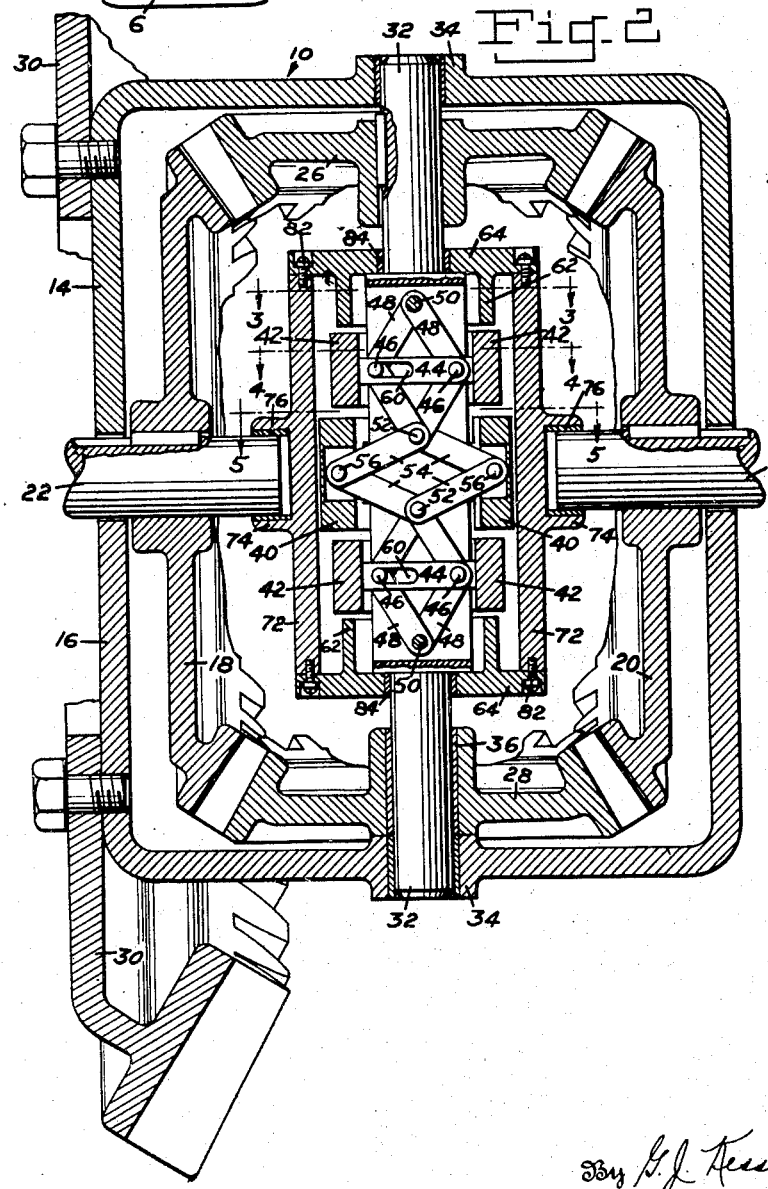
Inventor
John F. Schmidt Nov. 16, 1943.  J. F. SCHMIDT  2,334,221
POWER TRANSMISSION APPARATUS
Filed July 24, 1942    2 Sheets-Sheet 2
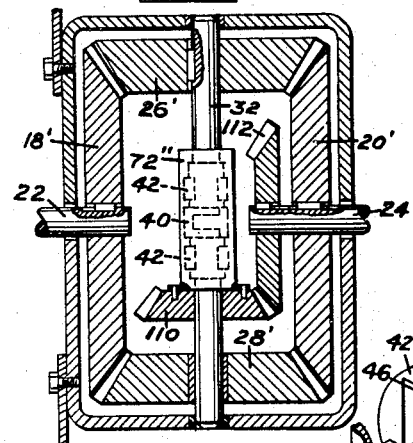
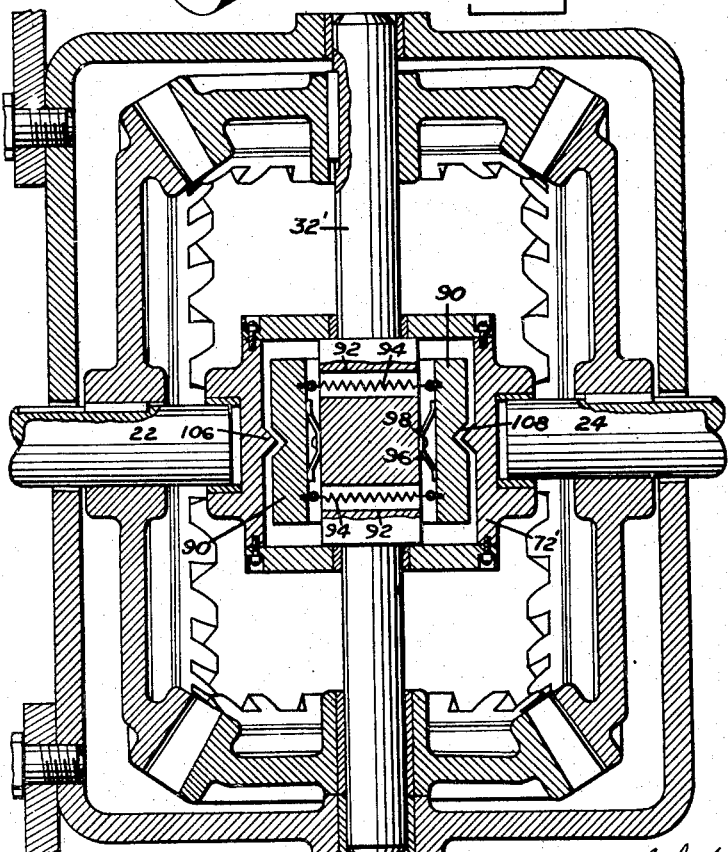
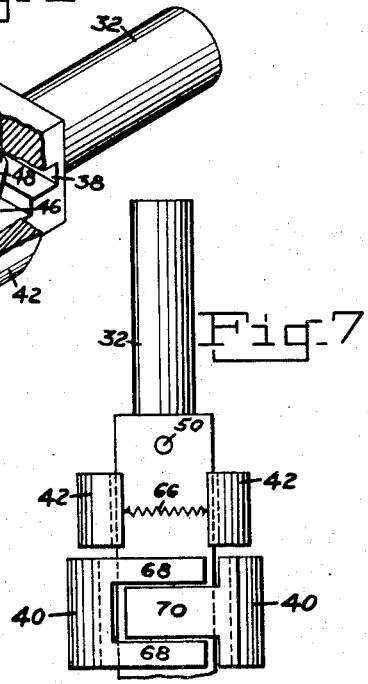
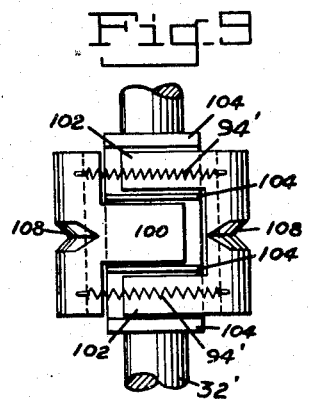
Inventor
John F. Schmidt Patented Nov. 16, 1943

2,334,221

UNITED STATES PATENT OFFICE 2,334,221

POWER TRANSMISSION APPARATUS

John F. Schmidt, United States Army,
Ann Arbor, Mich.

Application July 24, 1942, Serial No. 452,157

5 Claims. (Cl. 74—315)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to power transmission apparatus, particularly to apparatus in which the power is transmitted through a differential to two or more utilizers of power.

Many drivers of automotive vehicles have at some time or other found themselves in the annoying predicament of being stuck in a snowdrift, muddy road, or the like, where one driving wheel is resting on such a slippery spot that the coefficient of friction is too low to provide traction, with the result that that wheel spins, dissipating all the driving power of the engine, and the vehicle stands still. The characteristics of differentials in general use on automotive vehicles are such that the wheel with no traction spins, and the wheel that has a good coefficient of friction with the road receives no torque.

It is the object of this invention to provide power transmission apparatus in which the power may be supplied through a differential to two or more utilizers, and in which loss of the load at any utilizer will nevertheless permit the transmission of some power to the other or others. This is accomplished by the use of a clutch for transferring part of the power being delivered to the unloaded utilizer through the differential to a utilizer which is still loaded. The clutch consists of a friction member which is mounted to rotate with an idler gear of the differential. Cooperating with the friction member is another member mounted against rotation with the idler gear for engagement with the friction member to resist rotation of the idler gear. This resistance to rotation of the idler gear is absorbed by rotation of the differential side gear which is still loaded.

The specific nature of the invention as well as other objects and advantages thereof will clearly appear from a description of a preferred embodiment as shown in the accompanying drawings in which:

Figure 1 of the drawings shows a motor vehicle chassis to which the invention has been applied.

Figure 2 is a view in section substantially on line 2—2 of Figure 1. The axle housing is not shown.

Figure 3 is a view in section on the line 3—3 of Figure 2.

Figure 4 is a view in section on the line 4—4 of Figure 2.

Figure 5 is a view in section substantially on line 5—5 of Figure 2.

Figure 6 is a perspective view of the countershaft assembly, with parts broken away and in section to show details.

Figure 7 is an elevational view of part of the countershaft assembly shown in Figure 6.

Figure 8 is a view in section of another embodiment of the invention.

Figure 9 is a view in elevation of part of the countershaft assembly shown in Figure 8.

Figure 10 is a view in section of still another embodiment of the invention.

Referring now to the drawings in detail, an automobile chassis is shown at 2, having a source of power 4, means to utilize that power in the form of wheels 6, and means to transmit the power to the utilizers comprising drive or propeller shaft 8 and differential 10 enclosed in differential housing 12.

Differential 10 may be substantially conventional, consisting of a frame which is preferably made in two parts 14 and 16 secured together by bolts (not shown), for convenience in assembly; side gears 18 and 20 are the media through which power is received from the differential, to be delivered to wheels 6 by axle halves 22 and 24 respectively; and idler gears 26 and 28 meshing with the side gears. Power is delivered to ring gear 30 of the differential by drive shaft 8 through a conventional pinion, not shown.

A countershaft 32 is mounted for rotation in bearings 34 of the frame. Countershaft 32 rotates freely in bearing 36 of idler gear 28 and is keyed to gear 26 for rotation therewith. Shaft 32 is preferably longitudinally slotted intermediate its end as shown at 38 to receive movable parts of the clutch mechanism. These parts comprise an engaging element such as friction shoe 40, an eccentrically mounted weight 42, and multiplying mechanism to apply the centrifugal force of weight 42 to element 40. In order to balance the centrifugal forces about the axis of rotation of shaft 32, two weights 42 are preferably provided at opposite ends of a diameter normal to that axis, and to balance the forces about the axis of rotation of shafts 22 and 24, a duplicate pair of weights 42 is preferably provided at the opposite end of shaft 32. Similarly, two elements 40 are provided, and these are disposed so as to be centered substantially on the axis of rotation of shafts 22 and 24. The said multiplying mechanism preferably consists of a pair of toggles interconnecting the weights 42 and elements 40 as shown in Figures 2 to 6. A link 44 connects each weight 42 to a pin 46 which engages toggle links 48. One end of the linkage is secured to shaft 32 by a pin 50. The other end of the linkage is secured to actuating pin 52 of the toggle which moves elements 40 into engaging position. This toggle comprises links 54, the outer ends of which are secured in elements 40 by pins 56 and are held apart by spacers 58. Although links 54 are pivotally secured to elements 40, links 44 are integral with their respective weights 42, giving stability and support to the weights. For greater stability and additional support, links 44 may be slotted as shown at 60 to receive the protruding ends of pins 46. Alternatively, weights 42 may be supported by annulus 62 of cover 64 (see Figs. 2 and 3), if desired. Weights 42 and elements 40 may be held in the retracted position by springs 66.

In order that no torque be transmitted through the toggle linkage other than that caused by acceleration of weights 42, elements 40 are provided with tails 68 and 70 which engage flat portions on shaft 32, as seen in Fig. 5. To give elements 40 stability against oscillation about pins 56, tails 68 and 70 are arranged to interlock, or dovetail, as shown in Fig. 7.

For cooperation with elements 40 in opposing rotation of shaft 32, member 72 is disposed adjacent elements 40 and is suitably secured against rotation with shaft 32, as by bosses 74 which are engaged by the end of shaft 22 or shaft 24, or by the ends of both shafts, as shown. Bosses 74 secure member 72 against rotation about the axis of rotation of shaft 32 without impeding the rotation about the axis of shafts 22 and 24 which is necessary for normal operation of the differential. Bosses 74 will preferably be provided with a suitable bearing bushing 76 to facilitate such rotation.

In order to facilitate the frictional engagement of elements 40 and member 72, elements 40 may be faced with a suitable friction material, not shown, similar to any of the clutch facing or brake lining materials. If desired, the cooperating surface of member 72 may be similarly faced. If a facing material is used, it may be cemented in place, or held by any other suitable method.

If it be desired to exclude the usual rear axle oils from engaging surfaces of elements 40 and member 72, the ends of member 72 may be provided with substantially oil tight covers 64 held in place by screws 82 or any other suitable means. Covers 64 will preferably be provided with bearings 84 to permit the free running of shaft 32 in the openings and to provide an effective seal against oil leakage into the interior of member 72.

In the embodiment of the invention shown in Figs. 8 and 9, the weight and the friction member are combined into a single element 90. As can be seen from the figures, the preferred form of this embodiment is that in which two elements 90 are provided for dynamic balance. These two elements are preferably mounted with their centers of gravity substantially on the axis of rotation of shafts 22 and 24 to balance out centrifugal forces due to rotation about that axis. Countershaft 32' may be bored diametrically as indicated at 92 to receive retracting springs 94. Alternatively, because of difficulties of assembly, these springs may be disposed at the sides, as shown at 94' in Fig. 9, in which case boring of the countershaft would not be necessary. If desired, small leaf springs 96 may be secured to shaft 32' at 98 to limit the extent of retraction of elements 90 in order to reduce the amount of radial movement of these elements.

As with members 40 of Figs. 2 to 7, members 90 are preferably provided with tails 100 and 102 engaging flat portions of the countershaft to absorb the torque on members 90 upon engagement with cooperating member 72'. However, in the embodiment of Figs. 8 and 9, these tails also maintain the alignment of members 90 axially of shaft 32' by engagement with upstanding ridges 104 on the flat portions of the countershaft.

If desired, the friction surface may be enlarged by the use of one or more annular ridges 106 on the interior of member 72', these ridges cooperating with grooves 108 in members 90. A further advantage of these ridge-and-groove combinations is that any unwanted oil inside member 72' tends to be thrown axially of shaft 32' because of the revolution about the axis of shafts 22 and 24. Furthermore, however, any oil or ridge 106 would be thrown off the peak by the centrifugal force imparted to it due to contact with members 90 rotating about the axis of shaft 32'.

As will be understood by those skilled in the art, the wedging action of the cooperating ridge and grooves can be made to contribute materially to the coefficient of friction of the relatively moving surfaces.

It is of course evident that the cooperating ridge and groove of Fig. 8 can be utilized in the embodiment of Figs. 2 to 7.

Except for the differences above set forth, the structure of the embodiment of Figs. 8 and 9 is substantially the same as that of Figs. 2 to 7, as can be seen from the figures of the drawings.

In the embodiment of the invention shown in Fig. 10, a different method of transmitting torque from one shaft to the other is shown. In Fig. 10, the conventional side gears 18' and 20' are shown meshing with idler gears 26' and 28'. Shaft 32 is keyed to gear 26' and rotates freely in gear 28', as in Figs. 2 and 8. The member 72'' may house a clutch mechanism identical with that of either Fig. 2 or Fig. 8, as desired. However, instead of member 72'' being mounted against rotation about shaft 32, it is drivingly connected to one of the side gears through gears 110 and 112, gear 110 being secured to member 72'' and gear 112 having its connection direct to shaft 24 as shown. Alternatively a boss may be formed integral with gear 20' and the teeth of gear 112 be cut in that boss or, to simplify the structure still more, gears 110 and 112 may be eliminated entirely by securing member 72'' to gear 28'.

It will of course be understood that pertinent gear ratios, size of eccentrically mounted weights, and various retracting spring strengths will be so proportioned as to permit normal functioning of the differential for the conditions of driving likely to be encountered.

*Operation.*—Taking first the embodiment shown in Figs. 2 to 7 inclusive, suppose that one of the differential side gears is "unloaded"—i. e., it no longer is able to offer any appreciable resistance to turning. That is the situation when one of the drive wheels of a motor vehicle drive axle strikes a spot having too low a coefficient of friction. The unloaded side gear spins, receiving all the driving power of the propeller shaft, and the other side gear stops. Idler gears 26 and 28 rotate about the axis of countershaft 32, and these idler gears and shaft 32 revolve about the axis of shaft 22 and 24. However, this motion about the axis of shafts 22 and 24 may be ignored for the time being, because it does not affect the operation of the clutch mechanism.

As gear 26 rotates, it drives shaft 32. As the rotary speed of shaft 32 increases with increasing speed of the unloaded side gear, centrifugal force throws members 40 outward. This outward movement is augmented by that of weights 42 acting through the force multiplying mechanism consisting of the two pairs of toggles. These toggles permit a relatively small centrifugal force to put a tremendous outward squeeze behind elements 40, causing them to engage the inner wall of cooperating member 72. This engagement has a tendency to slow down gear 26, but since power is being applied to the unloaded gear in increasing measure, the only way the rotation of shaft 32 and gear 26 can be slowed down is for the stationary side gear to start to turn. As soon as it turns, it drives the wheel which has a good coefficient of friction with the ground, and the vehicle moves forward, where the differential is on a wheeled vehicle. It is of course understood that this invention is applicable generally, although it has specific advantages in its application to motor vehicles.

The operation of the embodiment of Figs. 8 and 9 is similar, except of course that the only actuating force is that set up by members 90 themselves as they rotate with the idler gear.

In the embodiment shown in Fig. 10, upon spinning of either shaft 22 or 24, gears 110 and 28', and shaft 32 rotate in opposite directions, resulting in element 72" rotating oppositely to the internal friction members 40 of shaft 32. Engagement of these friction members with the wall of element 72" results in a tendency to stop both shaft 32 and gear 110 or gear 28' if member 72" is secured to gear 28'. The reaction of the assembly toward the tendency of shaft 32 to slow down is a speeding up of the stationary side gear; this reaction is augmented by the reaction of the mechanism toward the tendency of gear 110 or 28' to be slowed down.

I claim:

1. In power transmission apparatus, a power source, two driven shafts normally loaded, means to transmit power from the source to the driven shafts, said means transmitting all the power to one shaft upon the removal of a substantial part of the load on that shaft, a countershaft arranged to rotate upon the unloading of a driven shaft, a friction member mounted for rotation with the countershaft, a cooperating friction member mounted against rotation with the countershaft, a weight eccentrically mounted on the countershaft to effect engagement of the friction members when the countershaft reaches a predetermined speed of rotation, and toggle linkage connected to transmit and multiply the centrifugal force of the eccentrically mounted weight to its associated friction member.

2. In power transmission apparatus, a power source, a differential having side gears and an idler gear, means to transmit power to the differential, means to receive power from the differential through the side gears, a countershaft associated with the idler gear and rotatable therewith, a member mounted against rotation with the countershaft, an element mounted on the countershaft and cooperable with said member to oppose rotation of the countershaft, an eccentrically mounted weight on the countershaft to move the element into rotation-opposing engagement with said member, and force multiplying mechanism connected to transmit the centrifugal force of the eccentrically mounted weight to the element.

3. In power transmission apparatus, a power source, a differential having side gears and an idler gear, means to transmit power to the differential, means to receive power from the differential through the side gears, a countershaft associated with the idler gear and rotatable therewith, a member drivingly associated with a side gear and rotatable about the countershaft, an element mounted on the countershaft and cooperable with said member to oppose relative rotation of the countershaft and member, and an eccentrically mounted weight on the countershaft to move the element into engagement with said member.

4. In the apparatus of claim 3, force multiplying mechanism connected to transmit the centrifugal force of the eccentrically mounted weight to the element.

5. A pair of drive wheels coaxially mounted and so interconnected that slipping of one wheel results in all the driving power being transmitted to that wheel, a countershaft mounted at right angles to the axis of rotation of the wheels and connected for rotation upon the occurrence of slipping of a drive wheel, a clutch including a pair of friction members eccentrically mounted on the countershaft, a member mounted to oppose rotation of the countershaft upon engagement with the said pair of friction members, an eccentrically mounted weight connected to move the friction members into engagement with the rotation opposing member at a predetermined rotary speed of the countershaft, and a pair of toggles connecting the weight and the friction members.

JOHN F. SCHMIDT.